United States Patent
Knutson et al.

(10) Patent No.: US 6,425,453 B1
(45) Date of Patent: Jul. 30, 2002

(54) TRANSMISSION ON ALL WHEEL STEER POWER MACHINE

(75) Inventors: Donald Knutson, Gwinner; Charles H. Krause, Hankinson; Kenneth R. Weber, Milnor, all of ND (US)

(73) Assignee: Clark Equipment Company, Woodcliff Lake, NJ (US)

( * ) Notice: Subject to any disclaimer, the term of this patent is extended or adjusted under 35 U.S.C. 154(b) by 0 days.

(21) Appl. No.: 09/733,103

(22) Filed: Dec. 8, 2000

(51) Int. Cl.$^7$ .................................................. B60K 7/30
(52) U.S. Cl. ........................ 180/256; 180/305; 180/357
(58) Field of Search .............................. 180/252, 253, 180/254, 255, 256, 257, 258, 259, 260, 261, 262, 305, 306, 307, 308, 357

(56) References Cited

U.S. PATENT DOCUMENTS

| | | | |
|---|---|---|---|
| 849,483 A | 4/1907 | Magie | |
| 1,815,839 A | 7/1931 | Ferguson | 180/6.7 |
| 2,748,509 A | 3/1956 | Brown | |
| 2,804,158 A | 8/1957 | Yunker | |
| 2,906,359 A | 9/1959 | Tucker, Sr. | |
| 2,922,482 A | 1/1960 | Fisher | |
| 2,926,735 A * | 3/1960 | Cook | 180/256 |
| 3,161,172 A | 12/1964 | Kassbohrer | |
| 3,180,305 A | 4/1965 | Gower-Rempel | |
| 3,596,730 A | 8/1971 | Cecce | 180/79.2 |
| 3,620,321 A | 11/1971 | Thilbodeau | 180/46 |
| 3,666,034 A | 5/1972 | Stuller et al. | 180/6.48 |
| 3,977,693 A | 8/1976 | Gamaunt | 280/91 |
| 3,980,149 A * | 9/1976 | Blomstrom et al. | 180/9.5 |
| 3,983,950 A | 10/1976 | Fabian | 180/24 |
| 4,074,484 A | 2/1978 | Lee et al. | 180/24 |
| 4,074,784 A | 2/1978 | Lee et al. | 180/24 |
| 4,090,581 A | 5/1978 | Miner et al. | 180/140 |
| 4,168,757 A | 9/1979 | Mather et al. | 180/6.48 |
| 4,205,730 A | 6/1980 | McColl | 180/261 |
| 4,300,651 A * | 11/1981 | Krude | 180/256 |
| 4,407,381 A | 10/1983 | Oswald et al. | 180/6.48 |
| 4,446,941 A | 5/1984 | Laurich-Trost | 180/236 |
| 4,498,554 A | 2/1985 | Young et al. | 180/236 |
| 4,549,610 A | 10/1985 | van der Lely | 172/3 |
| 4,690,231 A * | 9/1987 | Riml | 180/6.48 |
| 4,782,906 A | 11/1988 | Kole | 180/23 |
| 4,784,232 A | 11/1988 | Leboime | 180/6.2 |
| 4,962,821 A | 10/1990 | Kim | 180/6.48 |
| 5,052,979 A * | 10/1991 | Welschof et al. | 180/256 |
| 5,154,437 A | 10/1992 | Inagaki et al. | 280/91 |
| 5,230,399 A | 7/1993 | Plate | 180/140 |
| 5,492,348 A | 2/1996 | Shaw et al. | 180/79.1 |
| 5,618,156 A | 4/1997 | Brown | 414/694 |
| 6,029,431 A | 2/2000 | Dowler et al. | 56/14.3 |
| 6,283,237 B1 | 9/2001 | Muller | 180/6.48 |

FOREIGN PATENT DOCUMENTS

| | | |
|---|---|---|
| EP | 0 493 206 B1 | 9/1974 |
| EP | 0 627 335 B1 | 2/1996 |
| FR | 1 031 651 | of 1958 |
| FR | 81 03519 | of 1981 |
| GB | 770667 | 12/1954 |
| GB | 2 029 784 A | 8/1979 |
| WO | WO 90/06252 | 6/1990 |

* cited by examiner

Primary Examiner—Kevin Hurley
(74) Attorney, Agent, or Firm—Westman, Champlin & Kelly, P.A.

(57) ABSTRACT

A transmission in a power machine includes an axle having an inboard and outboard end. The outboard end is coupled to a wheel through a universal joint. The inboard end is coupled, through a sprocket assembly and chain drive linkage to a hydraulic motor. The axle is supported at it inboard end by a single spherical bearing.

19 Claims, 5 Drawing Sheets

TRANSMISSION ON ALL WHEEL STEER POWER MACHINE

BACKGROUND OF THE INVENTION

The present invention generally relates to transmissions for power machines. In particular, the present invention relates to a transmission on a power machine with a spherical bearing.

Power machines, such, as loaders, typically have a number of power actuators. Such actuators can include, for example, drive actuators or motors which provide traction power to the wheels or tracks of the machine. The actuators can also include those associated with manipulating a primary working tool, such as a bucket. In that case, the actuators include lift and tilt actuators. Of course, a wide variety of other actuators can also be used on such power machines. Examples of such actuators include auxiliary actuators, hand-held or remote tool actuators or other actuators associated with the operation of the power machine itself, or a tool coupled to the power machine.

The various actuators on such power machines have conventionally been controlled by mechanical linkages. For example, when the actuators are hydraulic actuators controlled by hydraulic fluid under pressure, they have been controlled by user input devices such as handles, levers, or foot pedals. The user input devices have been connected to a valve spool (of a valve which controls the flow of hydraulic fluid under pressure to the hydraulic actuator) by a mechanical linkage. The mechanical linkage transfers. the user input motion into linear displacement of the valve spool to thereby control flow of hydraulic fluid to the actuator.

Electronic control inputs have also been developed. The electronic inputs include an electronic sensor which senses the position of user actualable input devices (such as hand grips and foot pedals). In the past, such sensors have been resistive-type sensors, such as rotary or linear potentiometers.

In the past, transmissions have included chain drive transmissions. A hydraulic motor has been coupled to an axle through a sprocket, via a chain linkage. Rotation of the hydraulic motor drives rotation of the axle and consequent rotation of the wheels. However, past transmissions have been configured such that the inboard end of the axle is supported inside a differential by a tapered roller bearing arrangement. Other transmissions have included two sets of bearings. An inboard and an outboard set of bearings are configured relative to the axle to handle both axial: and radial loads on the axle.

SUMMARY OF THE INVENTION

A transmission in a. power machine includes an axle having an inboard and outboard end. The outboard end is coupled to a wheel through a universal joint. The inboard end is coupled, through a sprocket assembly and chain drive linkage, to a hydraulic motor. The axle is supported at its inboard end by a single spherical bearing.

DETAILED DESCRIPTION OF THE ILLUSTRATIVE EMBODIMENTS

Figure 1:
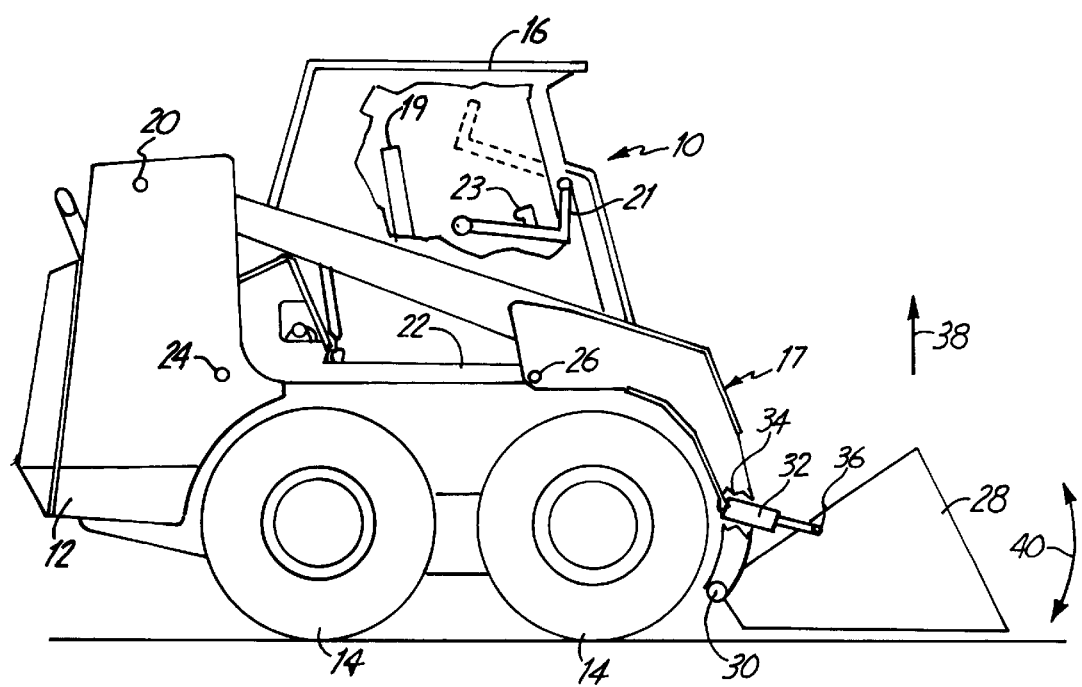
FIG. 1 is a side elevational view of a power machine in accordance with one embodiment of the present invention.

FIG. 1 is a side elevational view of one embodiment of a loader 10 according to the present invention. Loader 10 includes a frame 12 supported by wheels 14. Frame 12 also supports a cab 16 which defines an operator compartment and which substantially encloses a seat 19 on which an operator sits to control, skid steer loader 10. A. seat bar 21 is optionally pivotally coupled to a front portion of cab 16. When the operator occupies seat 19, the operator then pivots seat bar 21 from the raised position (shown in phantom in FIG. 1) to the lowered position shown in FIG. 1.

A pair of steering joysticks 23 (only one of which is shown in FIG. 1) are mounted within cab 16. Joysticks 23 are manipulated by the operator to control forward and rearward movement of loader 10, and in order to steer loader 10.

A lift arm 17 is coupled to frame 12 at pivot points 20 (only one of which is shown in FIG. 1, the other being identically disposed on the opposite side of loader 10). A pair of hydraulic cylinders 22 (only one of which is shown in FIG. 1) are pivotally coupled to frame 12 at pivot points 24 and to lift arm 17 at pivot points 26. Lift arm 17 is coupled to a working tool which, in this embodiment, is a bucket 28. Lift arm 17 is pivotally coupled to bucket 28 at pivot points 30. In addition, another hydraulic cylinder 32 is pivotally coupled to lift arm 17 at pivot point 34 and to bucket 28 at pivot point 36. While only. one cylinder 32 is shown, it is to be understood that any desired number of cylinders can be used to work bucket 28 or any other suitable tool.

The operator residing in cab 16 manipulates lift arm 17 and bucket 28 by selectively actuating hydraulic cylinders 22 and 32. In prior loaders, such actuation was accomplished by manipulation of foot pedals in cab 16 or by actuation of hand grips in cab 16, both of which were attached by mechanical linkages to valves (or valve spools) which control operation of cylinders 22 and 32. However, this actuation can also be accomplished by moving a movable element, such as a joystick, foot pedal or user actuable switch or button on a hand grip or joystick 23 and electronically controlling movement of cylinders 22 and 32 based on the movement of the movable element. In one embodiment, movement of the movable elements is sensed by a controller in the hand grip and is communicated to a main control computer used to control the cylinders and other hydraulic or electronic functions on a loader 10.

By actuating hydraulic cylinders 22 and causing hydraulic cylinders 22 to increase in length, the operator moves lift arm 17, and consequently bucket 28, generally vertically upward in the direction indicated by arrow 38. Conversely, when the operator actuates cylinder 22 causing it to decrease in length, bucket 28 moves generally vertically downward to the position shown in FIG. 1.

The operator can also manipulate bucket 28 by actuating cylinder 32. This is also illustratively done by pivoting or actuating a movable element (such as a foot pedal or a hand grip on a joystick or a button or switch on a handgrip) and electronically controlling cylinder 32 based on the movement of the element. When the operator causes cylinder 32 to increase in length, bucket 28 tilts forward about pivot points 30. Conversely, when the operator causes cylinder 32 to decrease in length, bucket 28 tilts rearward about pivot points 30. The tilting is generally along an arcuate path indicated by arrow 40.

While this description sets out many primary functions of loader 10, a number of others should be mentioned as well. For instance, loader 10 may illustratively include blinkers or turn signals mounted to the. outside of the frame 12. Also loader 10 may include a horn and additional hydraulic couplers, such as front and rear auxiliaries, which may be controlled in an on/off or proportional fashion. Loader 10 may also be coupled to other tools which function in different ways than bucket is 28.. Therefore, in addition to, or instead of, the hydraulic actuators described above, loader 10 may illustratively include many other hydraulic or electronic actuators as well.

In one illustrative embodiment, loader 10 is an all-wheel steer loader. Each of the wheels is both rotatable and pivotable on the axle on which it is supported. Pivoting movement can be driven using a wide variety of mechanisms, such as a hydraulic cylinder, an electric motor, etc. For the sake of clarity, the present description will proceed with respect to the wheels being individually steered with hydraulic cylinders.

In addition, loader 10 illustratively includes at least two drive motors, one for the pair of wheels on the left side of the vehicle and one for the pair of wheels on the right side of the vehicle. Of course, loader 10 could also include a single drive motor for all four wheels, or a drive motor associated with each wheel.

By moving or pivoting the handgrip or a set of steering levers located in the operator's compartment, the operator controls the hydraulic motors. In doing so, the operator controls both direction of rotation of the motors, and motor speed. This allows the operator to control the fore/aft movement of the loader, as well as loader direction and speed.

Figure 2:
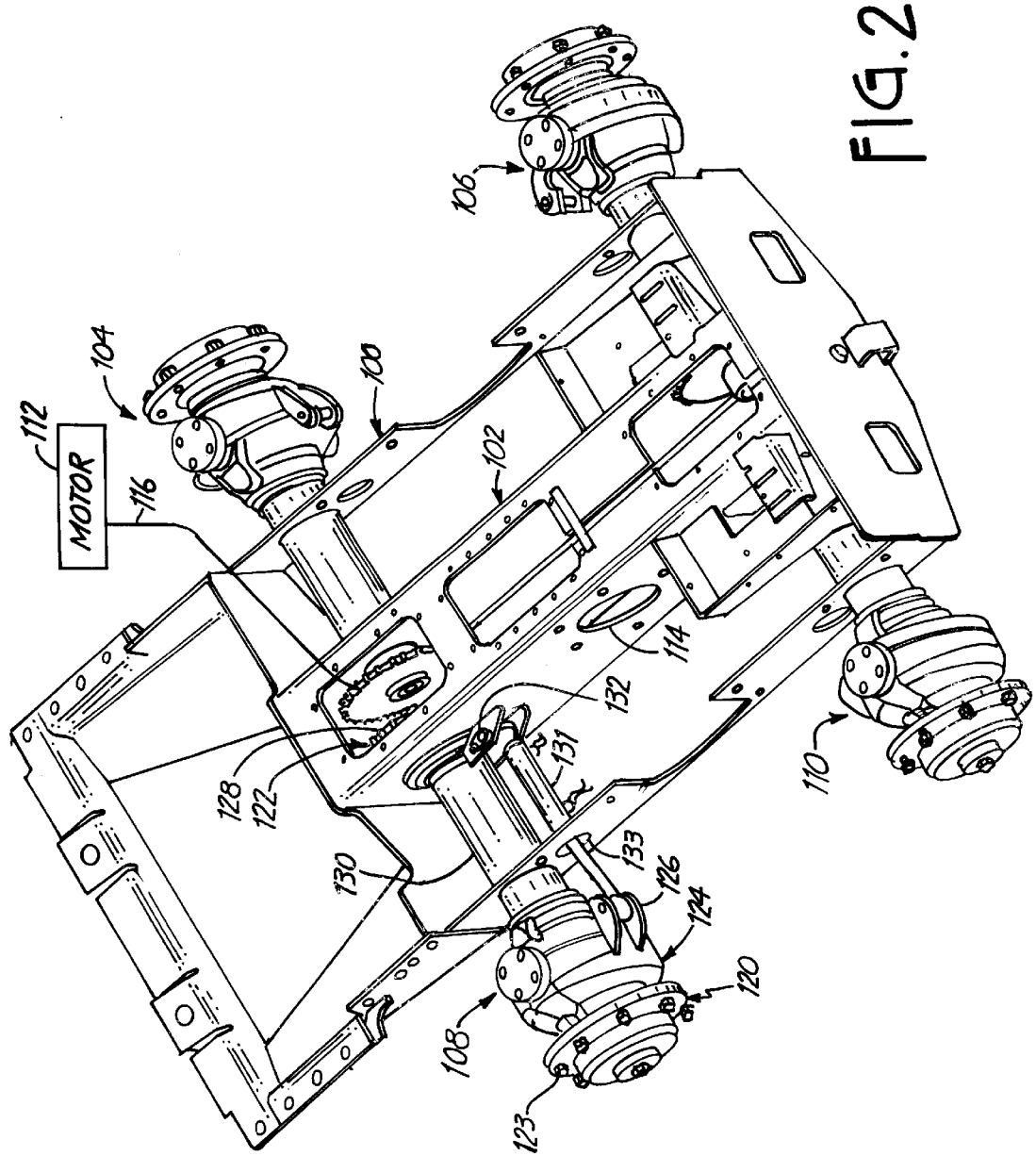
FIG. 2 is a perspective view illustrating a transmission of the power machine shown in FIG. 1, with the motor and portions of the chain case removed for the sake of clarity.

FIG. 2 is a perspective view of a portion of loader 10, with the upper portion of loader 10 removed exposing only a chasis or structural body portion 100 as well as a chain case 102. FIG. 2 also illustrates four transmission assemblies 104, 106, 108 and 110 which are used to drive rotation of wheels 14 on loader 10. FIG. 2 also illustrates a motor 112 diagrammatically. It will be appreciated that motor 112 is illustratively a hydraulic motor connected through aperture 114 in chain case 102. Motor 112 illustratively includes a rotatable output drive shaft and sprocket assembly which is connected to a corresponding sprocket assembly on a corresponding transmission by a chain drive linkage diagrammatically illustrated by arrow 116. It, will also be appreciated that from one to four motors 112 can be provided on loader 10 such that a single motor drives all wheels or such that some of the wheels are individually driven pr are driven in pairs. For the sake of clarity, only a single motor 112 is diagrammatically shown in FIG. 2. Transmissions 104–110 are illustratively substantially identical to one another. Therefore, the present description will proceed only with respect to transmission 108.

Transmission 108 includes an outboard end 120 and an inboard end 122. Outboard end 120 includes a tire mounting hub 123, a universal joint 124, and a steering connection tab 126. Inboard end 122 includes a sprocket assembly 128 which is described in greater detail with respect to FIGS. 3–5. The inboard end 122 is connected to the outboard end 120 by an axle assembly 130. Axle assembly 130 is also discussed in greater detail with respect to FIGS. 3–5.

In order to steer the tires mounted on hub 123 a hydraulic cylinder 131 is coupled at a pivot axis 132 on chain case 102 and to steering tabs 126 on universal joint 124. In one illustrative embodiment, hydraulic cylinder 131 has its base end, and all hoses and hose couplings, on the interior of structural body member 100, and only the rod end of cylinder 131 extends through an aperture 133 in structural body member 100 to connect to tabs 126.

Cylinder 131 is illustratively connected to a hydraulic power system in loader. 10 which provides hydraulic fluid under pressure to the base and rod ends of cylinder 131 through the hoses and couplings to lengthen or shorten the cylinder, respectively. The valves controlling provision of hydraulic fluid under pressure to cylinder 131 are illustratively controllable by user inputs located within the operator compartment of loader 10. When the operator causes cylinder 131 to be lengthened or shortened, this consequently causes the wheel mounted to hub 123 to be turned in opposite directions at universal joint 124.

Figure 3:
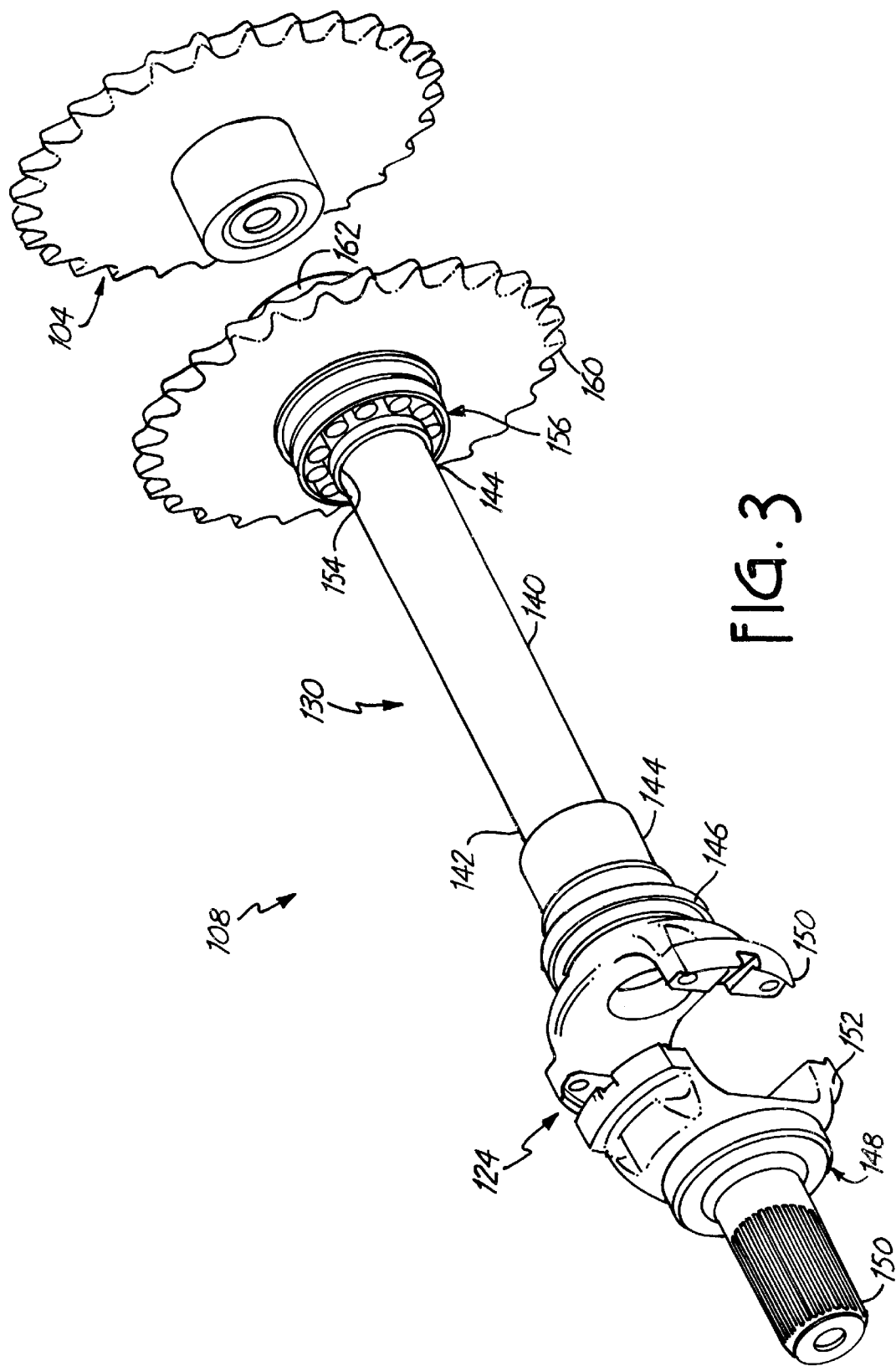
FIG. 3 is a more detailed view of one portion of the transmission shown in FIG. 2.

FIG. 3 is a more detailed view of transmission 108 with the chain case and a portion of universal joint 124 removed, and also with an outer axle tube (which surrounds the axle) removed. These items have been removed for the sake of clarity. FIG. 3 also illustrates a portion of transmission 104 as it is disposed relative to transmission 108, when mounted to the chain case.

FIG. 3 illustrates that axle assembly 130 includes an axle 140, itself having an outboard end 142 and an inboard end 144. Outboard end 142 has a splined end which frictionally engages female yoke 144. The outboard end of female yoke 144 is surrounded by a seal 146 which seals the internal connection portions of universal joint 124. A portion of universal joint 124 is also shown in FIG. 3.

In one illustrative embodiment, universal joint 124 includes a simple Hooke's joint, or Cardan joint. In such an embodiment, yoke 144 is attached to yoke 148 (which has a splined outboard end 150 adapted to receive hub 123 thereabout) by a spider which includes coupling members 150 and 152.

The inboard end 144 of axle 140 illustratively includes a shoulder . 154 formed thereon. Of course, shoulder 154 can be an annular ring which is welded to the external periphery of the outboard end 144 of axle 140, or shoulder 154 can be integrally formed with axle 140. In any case, shoulder 154 acts as a positive stop for spherical bearing 156.

Spherical bearing 156 illustratively includes an internal longitudinal bore for fitting over the external periphery of axle 140. Drive sprocket 160 is coupled to the end of axle 140 and is secured on the end of axle 140 by an end cap 162 which is, itself, secured on the end of axle 140 by a screw. This assembly is illustrated in greater detail in FIGS. 4 and 5. Therefore, rotation of drive sprocket 160, in turn, causes rotation of axle 140 within spherical bearing 156. This also causes rotation of yoke 144 within seal 146, and consequently causes rotation of coupling member 150 in universal joint 124. This, of course, in turn transmits the rotation of axle 140 into rotation of yoke 148 and consequent rotation of the tire mounted to yoke 148.

Figure 4:
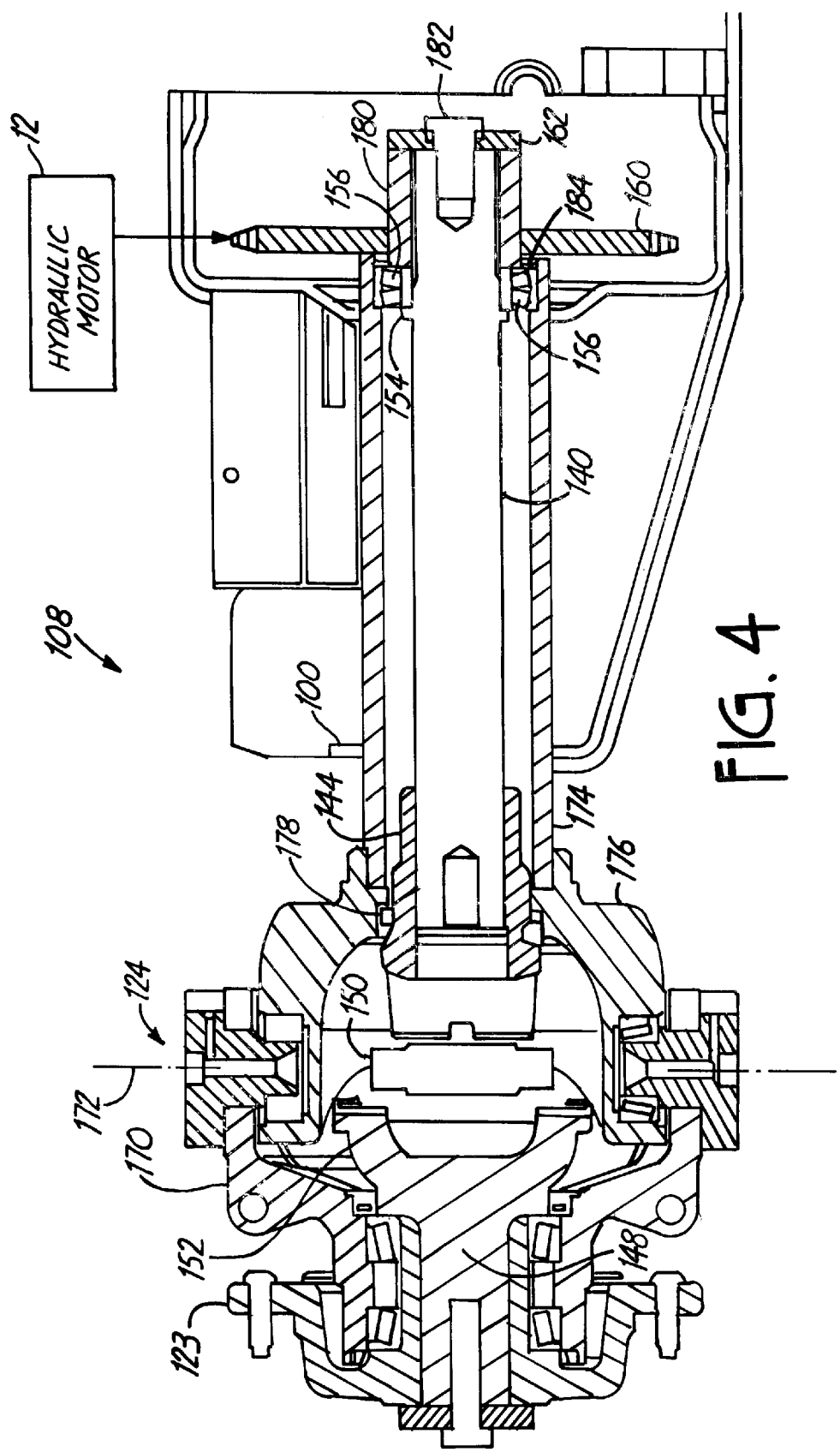
FIG. 4 is a more detailed view of a portion of the transmission shown in FIG. 3; with portions shown in cross section.

FIG. 4 is a more detailed illustration shown in partial cross section. FIG. 4 shows, in greater detail, that yoke 148 is connected to yoke 144 through a spider in universal joint 124. Yoke 148 is, in turn, securely connected to hub 123 which is adapted for a mounting of a tire thereon. Yoke 144 is, of course, rigidly coupled to axle 140 through a spline. It should also be noted, in one illustrative embodiment, mounting tabs 126 (shown in FIG. 2) are mounted to an exterior portion 170 of a housing, which houses a portion of universal joint 124. This allows yoke 148 (and consequently hub 123) to be pivoted, about axis 172, in order to steer the wheel mounted on hub 123.

FIG. 4 also illustrates that axle 140 is substantially enclosed by an axle tube 174. The outboard end of axle 174 has a housing member 176 attached thereto. Housing member 176 serves to further enclose universal joint 124. Yoke 144 is rotatably mounted within housing member 176 and the internal portion of universal joint 124 is sealed with a seal 178, which is illustratively any seal suitable for sealably receiving a rotatable member.

Axle tube 174 is also disposed through an aperture in structural body member 100 to position axle 140 at a desired location relative to structural body member 100.

FIG. 4 further illustrates that the inboard end of axle 140 has spherical bearing 156 mounted thereabout. In the embodiment illustrated in FIG. 4 shoulder 154 which holds spherical bearing 156 from migrating in the outboard direction along axle 140 is simply an integral shoulder integrally formed on the outer periphery of axle 140. Similarly, spherical bearing 156 is held in place, from migrating in the inboard direction along axle 140, by a clamp 180 which is rigidly coupled to drive sprocket 160. Clamp 180 can illustratively be coupled to drive sprocket 160 by inertial welding, or by any other suitable technique for rigidly coupling drive sprocket 160 to clamp 180. Clamp 180 is connected to the extreme inboard end of axle 140 by a spline arrangement. Clamp 180 is held in place on the spline, illustratively by a frictional fit, or by end cap (or washer) 162 which can also be connected to the inboard end of axle 140 by inertial welding, or it can be held in place by a bolt or screw 182, or both. Of course, drive sprocket 160 can be connected to axle 140 by any other suitable means as well.

It should also be noted that, in one illustrative embodiment, spherical bearing 156 is held in place by an, additional retaining ring 184 as well. Retaining ring 184 can be welded to the inside of axle tube 174, or it can be welded or otherwise connected to the exterior periphery or the end of clamp 180. In any case, retaining ring 184 is illustratively provided in the assembly shown.

Figure 5:
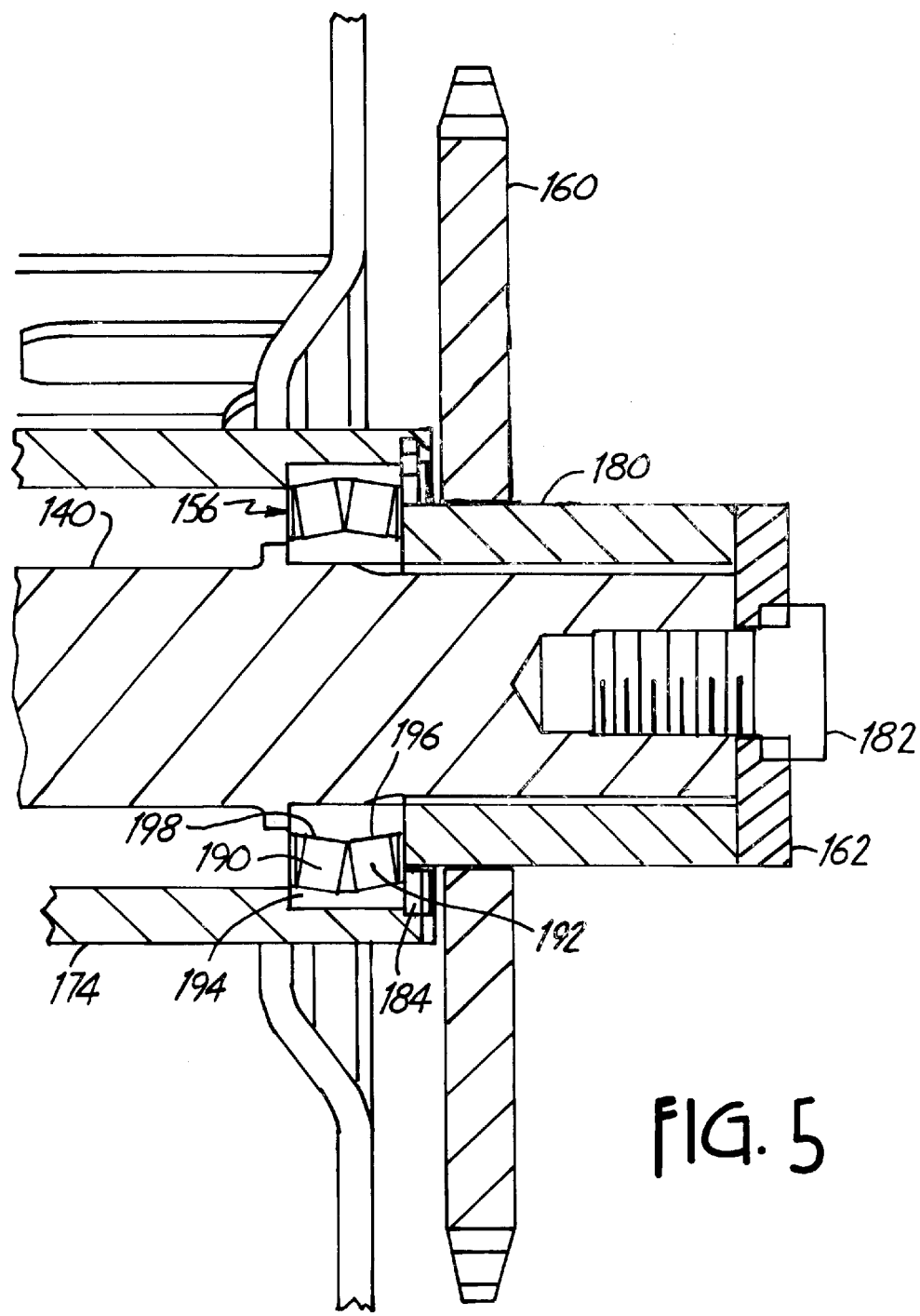
FIG. 5 is a more detailed view of a sprocket assembly shown in FIG. 4, in cross section.

FIG. 5 is a more detailed illustration of the sprocket assembly and spherical bearing. FIG. 5 more clearly shows that spherical bearing 156 is illustratively a spherical roller bearing which includes two rows of rollers 190 and 192 which have a common sphered outer raceway 194 and two inner ring raceways 196 and 198 which are inclined at an angle to the bearing axis. Thus, spherical bearing 156 is self aligning in that misalignment between axle 140 and the bearing housing can be accommodated. The bearing is thus insensitive to angular misalignment of the shaft with respect to the housing or to shaft bending during operation. Also, of course, such a spherical roller bearing is illustratively particularly suitable for carrying combined (radial and axle) loads. This provides significant advantages over the use of two single angular contact spherical plan bearings. In order to accommodate both radial and axle loads, such bearings must usually be adjusted against one another and arranged such that their sphere centers coincide. However, by using only a single spherical bearing 156, neither a differential is required, nor is a set of single angular contact bearings.

Although the present invention has been described with reference to preferred embodiments, workers skilled in the art will recognize that changes may be made in form and detail without departing from the spirit and scope of the invention.

What is claimed is:

1. A power vehicle transmission transmitting a drive output from a hydraulic motor mounted to a body of a vehicle to a wheel, the transmission comprising:
   a sprocket assembly adapted to receive a drive input from a motor driven chain;
   an axle rigidly coupled to the sprocket assembly, the axle having an inboard end and an out board end;
   a single spherical bearing coupling the inboard end of the axle to the body of the vehicle;
   a universal joint coupled to the outboard end of the axle; and
   a wheel hub coupled to the universal joint.

2. The transmission of claim 1 wherein the sprocket assembly comprises:
   a sprocket having a central region and an outer periphery, the outer periphery being adapted to receive the chain; and
   a sleeve rigidly coupled about the inboard end of the axle and rigidly coupled to the central region of the sprocket.

3. The transmission of claim 2 wherein the axle includes an annular shoulder thereon and wherein the spherical bearing abuts an outboard side of the annular shoulder and is disposed about the axle inboard of the sleeve.

4. The transmission of claim 3 and further comprising:
   a retaining ring disposed between the outboard side of the spherical bearing and the inboard side of the sleeve.

5. The transmission of claim 3 wherein the sleeve is coupled to the axle by a spline.

6. The transmission of claim 5 wherein the sprocket assembly further comprises:
   an end cap rigidly coupled to the outboard end of the axle retaining the sleeve thereon.

7. The transmission of claim 2 and further comprising:
   a yoke rigidly coupled to the outboard end of the axle.

8. The transmission of claim 7 wherein the yoke is rigidly coupled to the axle with a spline.

9. The transmission of claim 7 and further comprising:
   an axle tube disposed about the axle over substantially an entire length of the axle.

10. The transmission of claim 9 wherein the axle tube is rigidly coupled to the body of the vehicle and further comprising:
    a seal disposed about the outboard end of the axle and disposed about a portion of the yoke.

11. The transmission of claim 1 and further comprising:
    a steering element coupled to the body of the vehicle and an outboard end of the universal joint to steer the wheel.

12. The transmission of claim 11 wherein the steering element comprises:
    a hydraulic cylinder having a rod end and a base end and a plurality of hose couplings.

13. The transmission of claim 12 wherein the body portion comprises a chain case and wherein the hydraulic cylinder is coupled to the chain case such that the base end and all of the hose couplings are mounted within an interior portion of the chain case and such that the rod end of the hydraulic cylinder extends outside the chain case.

14. A power machine having a body, comprising:
    a chain case coupled to the body;
    at least one hydraulic motor coupled to the chain case;
    a plurality of independently steerable and rotatable wheels;

a plurality of steering elements each coupled to one of the wheels and one of the chain case and the body;

a plurality of transmissions each coupled to one of the wheels and the at least one hydraulic motor, each of the transmissions comprising:
  a sprocket assembly including a chain;
  an axle rigidly coupled to the sprocket assembly, the axle having an inboard end and an out board end;
  a single spherical bearing coupling the inboard end of the axle to the body of the vehicle;
  a universal joint coupled to the outboard end of the axle; and
  a wheel hub coupled to the universal joint.

15. The power machine of claim.14 wherein the steering element comprises: .
  a hydraulic cylinder having a rod end and a base end and a plurality of hose couplings.

16. The power machine of claim 15.wherein the hydraulic cylinder is coupled to the chain case such that the base end and all of the hose couplings are mounted within an interior portion of the chain case and such that the rod end of the hydraulic cylinder extends outside the chain case.

17. The power machine of claim;14 wherein the sprocket assembly comprises.:
  a sprocket having a central region and an outer periphery, the outer periphery being adapted to receive the chain; and
  a sleeve rigidly coupled about the inboard end of the axle and rigidly coupled to the central region of the sprocket.

18. The power machine of claim 17 wherein the axle includes an annular shoulder thereon and wherein the spherical bearing abuts an outboard side of the annular shoulder and is disposed about the axle inboard of the sleeve.

19. The power machine of claim 14 wherein the plurality of wheels comprise four wheels and wherein the at least one hydraulic motor comprises two hydraulic motors each coupled to a pair of the four wheels.

* * * * *

UNITED STATES PATENT AND TRADEMARK OFFICE
CERTIFICATE OF CORRECTION

PATENT NO.     : 6,425,453 B1
DATED          : July 30, 2002
INVENTOR(S)    : Donovan Knutson et al.

It is certified that error appears in the above-identified patent and that said Letters Patent is hereby corrected as shown below:

<u>Title page,</u>
Item [75], Inventors, delete "Donald Knutson" and insert -- Donovan Knutson --.
Item [56], References Cited, U.S. PATENT DOCUMENTS, delete "2,906,359" and insert -- 2,906,358 --.
Item [57], ABSTRACT, change "The axle is supported at it inboard end by a single spherical bearing." to -- The axle is supported at its inboard end by a single spherical bearing. --

<u>Column 3,</u>
Line 54, delete "pr" and insert -- or --.

<u>Column 7,</u>
Line 15, after "comprises:" delete ".".

<u>Column 8,</u>
Line 3, after "claim", delete ";".
Line 4, after "comprises" delete ".".

Signed and Sealed this

Eleventh Day of February, 2003

JAMES E. ROGAN
*Director of the United States Patent and Trademark Office*